3,783,020
ANTI-HYGROSCOPIC ARC WELDING COATED ELECTRODE AND THE PROCESS FOR PRODUCING THE SAME
Shinji Kimura, Fujisawa, and Izumi Ichihara and Tsuyoshi Kawase, Kamakura, Japan, assignors to Kobe Steel, Ltd., Kobe, Japan
Filed Dec. 10, 1971, Ser. No. 206,823
Claims priority, application Japan, Dec. 28, 1970, 46/128,610
Int. Cl. B23k 35/00; C23g 1/00
U.S. Cl. 117—206
6 Claims

ABSTRACT OF THE DISCLOSURE

An anti-hygroscopic arc welding coated electrode contains, as a binder for the coating material of the electrode, a glass powder having a softening point of from 350° to 550° C., which melts and covers the grains of the coating material, when heated to a temperature above the said softening point, so as to form vitreous films therearound.

BACKGROUND OF THE INVENTION

Field of the invention

This invention relates to an anti-hygroscopic arc welding electrode and to a process for producing same, and more particularly to an anti-hygroscopic arc welding electrode which contains glass powder having a low softening point, as a binder for the coating material.

Description of the prior art

It is known that the presence of hydrogen at or near the welding zone can cause a variety of deleterious effects on the quality and soundness of the deposited weld metal. For instance, hydrogen gas can cause the development of blow holes in the deposited metal, or can cause cracking to occur in the heated zones.

It is believed that water moisture is the primary cause for the presence of hydrogen in the proximity of the welding zone and hence the prior art contains many suggestions of methods for minimizing the absorption of water or water moisture by the electrodes, and the presence of water or water moisture from the welding zone.

There are two major sources of water which must be contended with. One is the hygroscopicity of the water glass which is generally used as a binder for the coating material. The other is the moisture absorption characteristics of the electrodes after they have been packed.

Although water glass is widely used as a binder in electrodes, because of its relatively low cost, its high rigidity after drying and its ease of handling, it inherently contains water which cannot be completely removed by drying. To make matters worse, the water extracted by drying will be replaced by re-absorption and retained in the coating material as constitution water, which action is in general referred to as "hygroscopicity."

The usual drying temperature for conventional arc welding electrodes wherein hydrogen is not a serious problem is typically from 100° C. to 200° C. Where the presence of hydrogen is critical, such as in the case of producing so-called "low hydrogen welding electrodes," the drying temperature is typically raised to about 400° C. Even at such higher temperatures, however, dehydration is insufficient for water glass and the electrodes are unsatisfactorily hygroscopic.

When still higher temperatures, such as between 400° C. and 630° C., are used in the drying step, the degree of hygroscopicity is reduced. However, these higher temperatures will adversely affect the coating materials, by causing decomposition or oxidation.

In view of these difficulties, it is common to pack the electrodes in air-tight containers during shipment and to re-dry the electrodes after air exposure for a specified lapse of time. This, however, requires undesirable and complicated handling procedures.

A need exists, therefore, for a means of avoiding the hygroscopicity problems of electrodes, so as to enable a higher quality and sounder weld metal deposit, and to enable less complicated electrode handling procedures.

SUMMARY OF THE INVENTION

Accordingly, it is one object of this invention to provide an arc welding electrode which is characterized by a relatively low hygroscopicity.

Another object of this invention is to provide an electrode which does not require the complicated handling and treatment techniques of the prior art.

These and other objects have now herein been attained by the use of a glass powder having a relatively low softening part, within the range of 350°–550° C., as the binder material for the coating material of the electrode. The glass powder-coating material mixture is melted so that it covers the grains of the coating material, forming vitreous films thereon and providing long lasting reductions in hygroscopicity for the electrodes.

BRIEF DESCRIPTION OF THE DRAWINGS

This invention will be described by reference to certain drawings, in which.

DETAILED DESCRIPTION OF THE INVENTION

Figure 1:
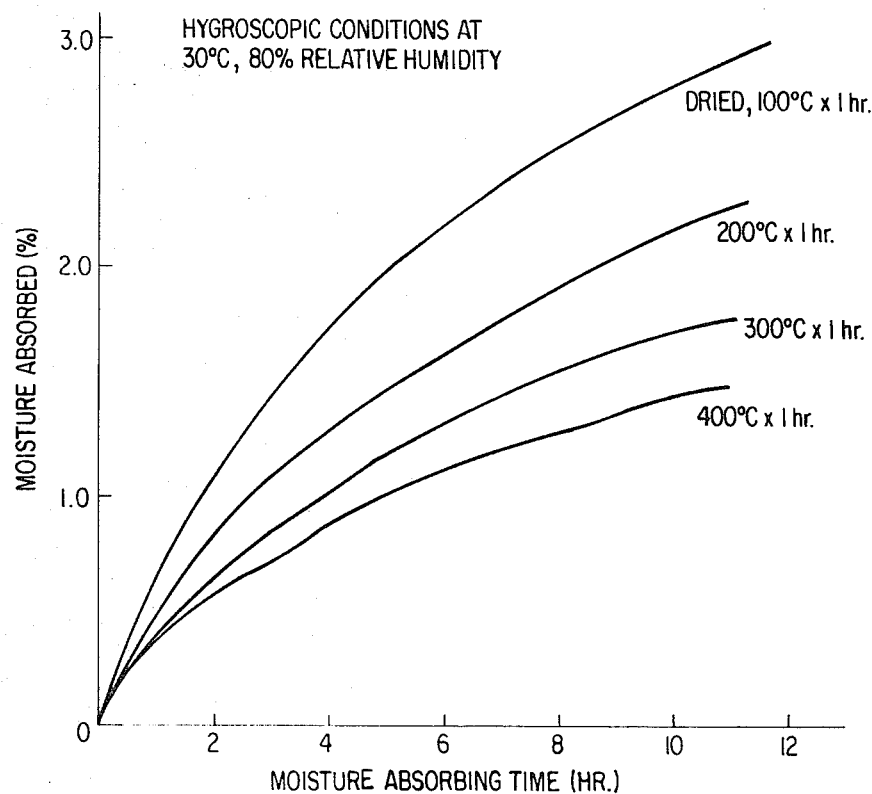
FIG. 1 is a graph of the hygroscopicity of conventional welding electrodes as a function of drying temperature and time.

FIG. 1 shows the tendency of conventional electrodes to absorb water or water moisture as a function of drying temperature and time. As is apparent therefrom, the higher the drying temperature, the greater will be the reduction in hygroscopicity. However, it is also apparent that the extent of water content absorbed will increase with time after drying, regardless of the drying temperatures.

Ordinarily, the electrode coating material ingredients are susceptible to decomposition, oxidation, or other quality deterioration when subjected to higher temperatures. To avoid this drawback, the present invention contemplates the use of a glass powder having a relatively low softening point, preferably in the range of from 350° to 550° C., which will not cause any adverse effects on the weld zone, and will thereby provide long lasting reduced hygroscopicity.

Suitable glass powders which conform to these requirements include $SiO_2$—$Na_2O$, $SiO_2$—$K_2O$, $$SiO—Na_2O—K_2O$$

$SiO_2$—$Na_2O$—$Al_2O_3$—$TiO_2$, $SiO_2$—$Na_2O$—$CaO$, $$SiO_2—Na_2O—ZrO_2$$

$SiO_2$—$MgO$—$Na_2O$, $SiO_2$—$B_2O_3$—$Al_2O_3$, and mixtures thereof or any of the above compositions or mixtures in further combination with fluorine or Li, which may be selected so as to provide an optimum softening point.

In the technique of this invention, the coating materials, with a reasonable proportion of the low softening point glass powder, is mixed and kneaded with water glass. Alternatively, the glass powder may first be mixed with water glass and then that mixture further mixed into the coating material. Either way, this mixture is then coated onto core wires by conventional means to form electrodes, and these electrodes are subjected to two drying cycles. In the first drying cycle, the temperature is maintained at 100°–400° C., wherein the water glass loses most of its contained water. In the second drying cycle, the temperature is raised beyond 400° C. for a short period of time, in order to completely remove any remaining water.

Simultaneously, during the second drying step, the glass powder will soften and become more fluid so that it readily permeates the interstices between the grains of coating materials, covering the sintered grains with a vitreous film which is highly resistant to hydgroscopicity.

While it is not completely understood why the low softening point glass provides such unique reductions in hygroscopicity, it is believed that the low softening temperature powder glass is partly dissolved into the water glass, and the nature of the water glass is changed as a result of the dissolved glass powder.

The exact amount of glass powder to be used will depend upon the extent of hygroscopicity permitted but usually will not exceed 20% by weight, based on the total weight of coating materials. Beyond 20% by weight, the performance of the welding electrode may be impaired. There is no particular lower limit as to the quantity of glass powder which may be used. Some improvements in hygroscopicity will be obtained within any quantity of the glass powder below 20% by weight. In fact, good reductions in hygroscopicity were obtained with use of 0.5% by weight.

The suitable softening point range of the glass powder was determined according to the following considerations:

(1) The softening point of the glass powder should be such that the glass powder will be sufficiently softened at the second drying temperature. In general, the second drying temperature should be 50° C. higher than the softening point of the particular glass powder used.

(2) The upper limit of the softening temperature range, i.e., 550° C., should be 80° C. lower than that of the maximum drying temperature in the second drying cycle, considering the deterioration of the coating materials. However, such upper limit should be such as to permit sufficient softening of the glass during the second drying cycle. If the glass has a softening temperature which is higher than that upper limit, sufficient softening may not be attained, so as to result in an electrode of poor hydroscopicity.

(3) The lower limit of the softening temperature range, i.e., 350° C., should be 50° C. lower than the minimum drying temperature (400° C.) in the second drying cycle for the aforesaid reasons. It may be possible to further lower the temperature range of the second drying cycle by using glass having a softening point lower than 350° C. However, to do so may result in insufficient dehydration before the softening of the glass powder. Furthermore, the almost simultaneous occurrence of dehydration and softening might impair the strength of the coating material. In other words, softening should preferably occur after dehydration has been completed.

Some suitable glass powder compositions are shown in Table 1.

TABLE 1.—COMPOSITIONS OF GLASS POWDERS HAVING RELATIVELY LOW SOFTENING POINTS

| Example: | $SiO_2$ | NaO | $K_2O$ | $Li_2O$ | CaO | $B_2O_3$ | $CaF_2$ |
|---|---|---|---|---|---|---|---|
| A | 43.6 | 19.3 | 19.5 | 3.5 | 3.9 | 9.1 | |
| B | 40.2 | 21.7 | 22.4 | 3.5 | | 9.0 | 3.2 |

The softening point of the glass powder, referred to as Example A above, is about 370° C., and that of Example B is only somewhat higher. These softening temperatures were measured on the basis of the evident reduction in volume of the test samples when they were subjected to two temperature settings, i.e., 350° and 400° C. The term "softening point" is meant to refer to that temperature at which a reduction in volume begins to occur.

Figure 2:
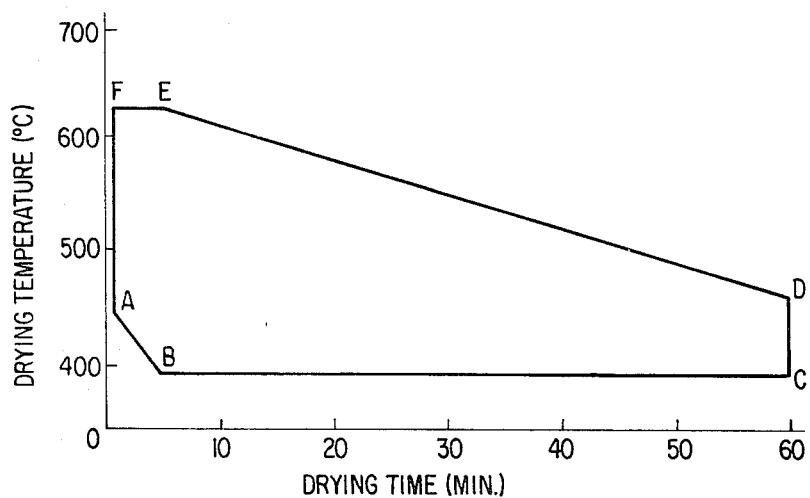
FIG. 2 is a graph of hygroscopicity as a function of drying temperature and drying time; and, FIG. 3 is a graph of absorbed water or water moisture content as a function of exposure time of the electrodes to a hygroscopic atmosphere.

As shown graphically in FIG. 2, any combination of drying temperatures and times may be used so long as they fall within the hexangle formed from the six points, i.e., A (450° C.×0.5 min.), B (400° C.×5 min.), C (400° C.×60 min.), D (470° C.×50 min.), E (630° C.×5 min.), and F (630° C.×0.5 min.). In other words, the second drying condition may be at a temperature of from 400° C. to 630° C. for periods of from 0.5 min. to 50 minutes.

The glass powder concept of this invention can be applied to a wide variety of electrode compositions. In fact, any composition which heretofore used water glass as a binder and suffered from the deleterious effects of hydrogen can be improved by the methods of this invention. Of course, the particular compositions of the core wire will depend upon the particular workpiece to be joined. In particular, however, electrodes containing limestone, fluorite, ferromanganese, ferrosilicon, alumina, silica, magnesia, rutile or the like are especially adaptable for use with the powder glass. The total coating material ranges from 20%–60% by weight of the electrode.

As indicated above, the glass may contain mixtures of $SiO_2$, $Na_2O$, $K_2O$, $Al_2O_3$, $TiO_2$, $ZnO_2$, MgO, $B_2O_3$, CuO, particularly those containing 35–60% by weight $Na_2O$, $K_2O$ or mixtures thereof, and 3–23% by weight of CaO or $B_2O_3$ or mixtures thereof. Optional amounts of lithium and/or fluorine may also be included.

Having now generally described the invention, a further understanding can be attained by reference to certain specific examples which are provided herein for purposes of illustration only and are not intended to be limiting unless otherwise specifically specified.

EXAMPLES

The low hydrogen coating material shown in Table 2 below was mixed with 5% by weight of a low softening point glass as is shown in Example B of Table 1.

TABLE 2

| | Weight percent |
|---|---|
| Limestone | 50 |
| Fluorite | 18 |
| Ferromanganese | 3.2 |
| Ferrosilicon | 13 |
| Aluminum | 2 |
| Silica | 2 |
| Magnesia | 1 |
| Rutile | 4 |
| Water glass | 6.8 |

Respective mixtures thus prepared were dried under first and second drying conditions, wherein the second drying conditions were 600° C.×5 min. (symbol a), 500° C.×45 min. (symbol b), 450° C.×5 min. (symbol c), 400° C.×50 min. (symbol d), and 400° C.×5 min. (symbol e), respectively. (The samples thus prepared are referred to herein as samples A.)

A glass powder of the same type as above was mixed with water glass beforehand and used as a binder for the coating materials. The materials thus prepared were heated under first and second drying conditions wherein the second drying conditions, 550° C.×5 min. (symbol f) and 450° C.×50 min. (symbol g), respectively. (The samples thus prepared are referred to as samples B.)

Figure 3:
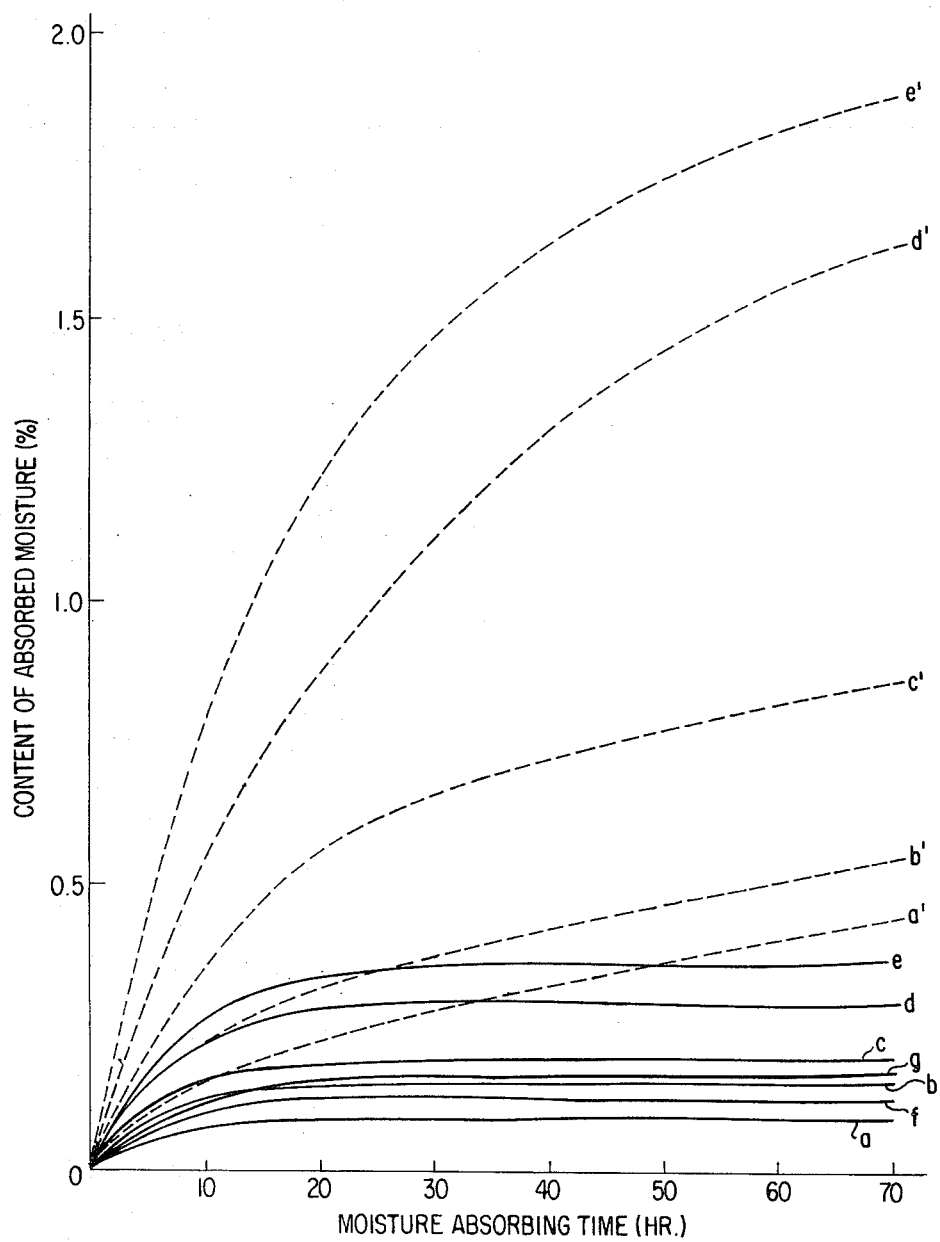

The samples A and B were tested for hygroscopicity under an atmospheric condition of 30° C. and 90% relative humidity. FIG. 3 compares these results using the above sample containing glass powder with analogous samples containing no glass powder, under the same drying conditions. In FIG. 3, the curves a, b, c, d, and e designate samples containing glass powder and the curves a', b', c', d', and e' represent the samples containing no glass powder. As can be seen from this figure, even with samples having no glass powder, there is a tendency of the moisture absorbing rate to be lower when they are subjected to higher drying temperatures during the second drying cycle. However, this is still insufficient for satisfactory results. It should be noted that the addition of the glass powder having a lower softening point keeps the moisture absorbing rate extremely lower, thus reducing hygroscopicity still further. Furthermore, the curves $a'$, $b'$, $c'$, $d'$ and $e'$ show a tendency for absorbed water content to increase even after 70 hours, whereas the curves $a$, $b$, $c$, $d$, and $e$ reach the saturation point at a lower water content level, showing no further increase. The water content at this level would exert no adverse effects due to the hydrogen, on the welding quality during the welding operation, and therefore it is not necessary to re-dry the electrodes before use, even if such electrodes have been stored under adverse atmospheric conditions such as higher temperature and higher humidity for a considerably longer time.

The process of the present invention is applicable to any type of coated electrode and is particularly advantageous for welding electrodes designated for use in high tensile steel where the adverse effect of hydrogen to any degree cannot be ignored. It should be recognized that the arc welding coated electrodes of the present invention will eliminate the necessity of protecting against moisture absorption and will result in stable welding quality (free of cracks in the weld zone). Moreover, it will permit greater flexibility for the welding conditions; for example, the use of lower preheating temperatures, thereby being of potentially great industrial value.

Having fully described the invention, it will be apparent to those skilled in the art that the novel principles of the invention disclosed herein in connection with specific examples thereof will suggest various other modifications and applications of the same. It is accordingly desired that in construing the breadth of the invention they shall not be limited except as specified in the appended claims.

What is claimed as new and desired to be secured by Letters Patent is:

1. An arc welding coated electrode, the coating of which contains water glass as a binder, characterized in that the coating contains in admixture with the coating materials forming said electrode a vitrified glass powder present in an amount up to 20% by weight, said glass powder having a softening point of from 350° C. to 550° C.

2. The arc welding coated electrode of claim 1 which contains 35 to 60% by weight of a member selected from the group consisting of $Na_2O$, $K_2O$ and mixtures thereof, and 3 to 23% by weight of a member selected from the group consisting of $CaO$ and $B_2O_3$ or mixtures thereof.

3. The arc welding coated electrode of claim 1 which further contains up to 15% $LiO_2$.

4. An arc welding coated electrode of reduced hydroscopicity the coating of which comprises in combination limestone, fluorite, ferromanganese, ferrosilicon, alumina, silica, magnesia, rutile and water glass, characterized in that the coating contains in admixture a vitrified glass powder present in an amount up to 20% by weight, said glass powder having a softening point of from 350° C. to 550° C.

5. A process for producing an arc welding coated electrode which comprises admixing up to 20% by weight of a glass powder with the coating materials forming said electrode, and with water glass, wherein said glass powder is characterized by a softening point of from 350° C. to 550° C., coating electrically conductive substrate with said admixture and drying said admixture at a temperature of from 100° C. to 400° C. followed by drying at a temperature of from 400° C. to 630° C.

6. The process of claim 5 furthe rcharacterized in that the second drying step is effected for a period of from 0.5 minute to about 50 minutes.

References Cited

UNITED STATES PATENTS

| | | | |
|---|---|---|---|
| 1,903,620 | 4/1933 | Esslinger | 117—206 |
| 2,586,516 | 2/1952 | Cobine | 117—202 |
| 2,983,632 | 5/1961 | Griffiths | 117—206 |
| 3,084,074 | 4/1963 | Wasserman | 117—206 |

RALPH S. KENDALL, Primary Examiner

M. F. ESPOSITO, Assistant Examiner

U.S. Cl. X.R.

117—202, 203, 204, 205